(12) United States Patent
Puget et al.

(10) Patent No.: US 11,313,742 B2
(45) Date of Patent: Apr. 26, 2022

(54) SYSTEM FOR ANALYSIS OF THE PERFORMANCE IN USE OF A SLIDING BOARD

(71) Applicants: Skis Rossignol, Saint-Jean de Moirans (FR); Commissariat a l'Energie Atomique et aux Energies Alternatives, Paris (FR)

(72) Inventors: Nicolas Puget, Novalaise (FR); Romain Bailly, Coublevie (FR); Johan Vailli, Coublevie (FR); Aurélie Zucco, Montelier (FR); Jerome Boutet, Grenoble (FR); Jean-Philippe Gros, Grenoble (FR); Maxime Gallardo, Grenoble (FR); Gael Parent, Grenoble (FR)

(73) Assignees: Skis Rossignol, Saint-Jean de Moirans (FR); Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 16/932,280

(22) Filed: Jul. 17, 2020

(65) Prior Publication Data
US 2021/0018380 A1    Jan. 21, 2021

(30) Foreign Application Priority Data
Jul. 18, 2019   (FR) ........................ 1908134

(51) Int. Cl.
*G01L 1/16*    (2006.01)
*G01C 19/00*   (2013.01)
(Continued)

(52) U.S. Cl.
CPC ............... *G01L 1/16* (2013.01); *G01C 19/00* (2013.01); *G01K 13/00* (2013.01); *G01S 19/52* (2013.01)

(58) Field of Classification Search
CPC .......... G01L 1/16; G01C 19/00; G01K 13/00; G01S 19/52
(Continued)

(56) References Cited

U.S. PATENT DOCUMENTS 5,590,908 A    1/1997   Carr
6,959,259 B2 * 10/2005  Vock ................... A42B 3/0433
                                                    342/104
(Continued)

FOREIGN PATENT DOCUMENTS

EP    0841969    5/1998
EP    3513846    7/2019
(Continued)

*Primary Examiner* — Octavia Hollington
(74) *Attorney, Agent, or Firm* — Forge IP, PLLC

(57) ABSTRACT

A system for analysis of the performance in use of a sliding board includes a database storing baseline performance; a sensor sensitive to the deformations of said sliding board; and a monitoring body. The monitoring body determines the performance in use based on measurements from the sensor; and compares the performance in use with the baseline performance. The sensor is secured to the sliding board and has at least one piezoelectric element secured to the sliding board and configured to generate electric energy during the deformations of the sliding board; and an electronic processing circuit, powered exclusively by the electric energy generated by the at least one piezoelectric element.

12 Claims, 15 Drawing Sheets

(51) Int. Cl.
*G01K 13/00* (2021.01)
*G01S 19/52* (2010.01)

(58) Field of Classification Search
USPC .................................................. 73/862.625
See application file for complete search history.

(56) References Cited

U.S. PATENT DOCUMENTS

| | | | | |
|---|---|---|---|---|
| 7,080,849 | B2* | 7/2006 | Lammer | A63C 5/075 |
| | | | | 280/602 |
| 8,612,181 | B2* | 12/2013 | Czaja | G05D 19/02 |
| | | | | 702/188 |
| 9,020,782 | B2* | 4/2015 | Czaja | A43B 3/0005 |
| | | | | 702/188 |
| 9,629,558 | B2* | 4/2017 | Yuen | A61B 5/0816 |
| 2002/0116147 | A1 | 8/2002 | Vock et al. | |
| 2006/0181075 | A1* | 8/2006 | Kawai | A61B 5/22 |
| | | | | 280/809 |
| 2012/0139731 | A1* | 6/2012 | Razoumov | G16Z 99/00 |
| | | | | 340/573.1 |
| 2015/0057112 | A1 | 2/2015 | Sak et al. | |
| 2019/0224562 | A1 | 7/2019 | Puget et al. | |

FOREIGN PATENT DOCUMENTS

| | | |
|---|---|---|
| FR | 2891998 | 4/2007 |
| WO | WO9704841 | 2/1997 |
| WO | WO2011160040 | 12/2011 |
| WO | WO2018170119 | 9/2018 |

* cited by examiner

[Fig 1]
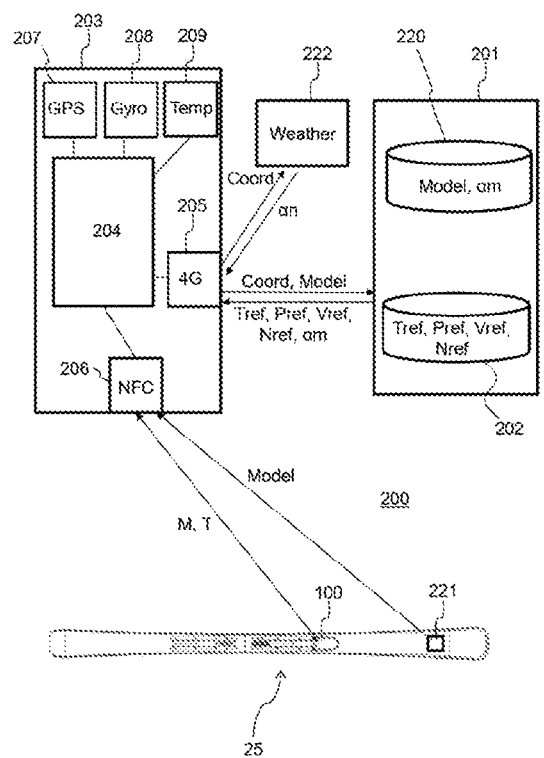

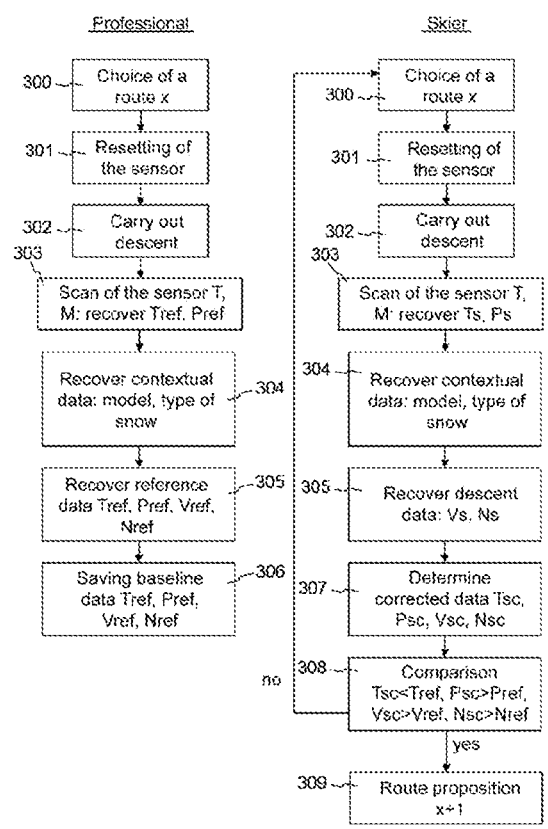
[Fig 2]

[Fig 3]
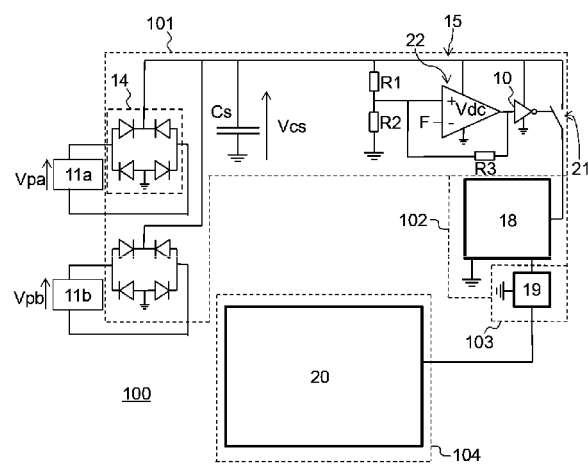

[Fig 4]
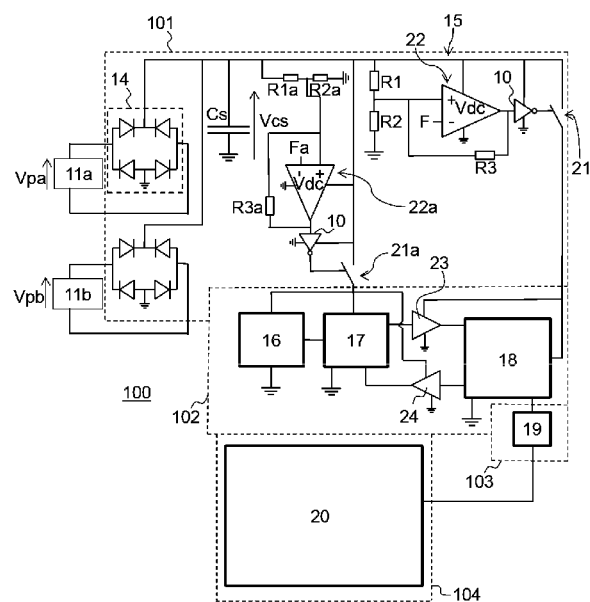

[Fig 5]
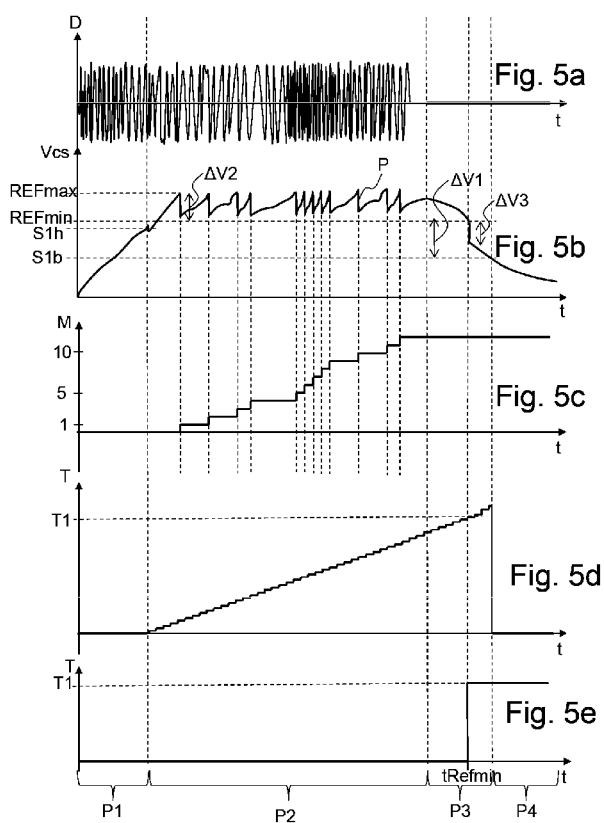

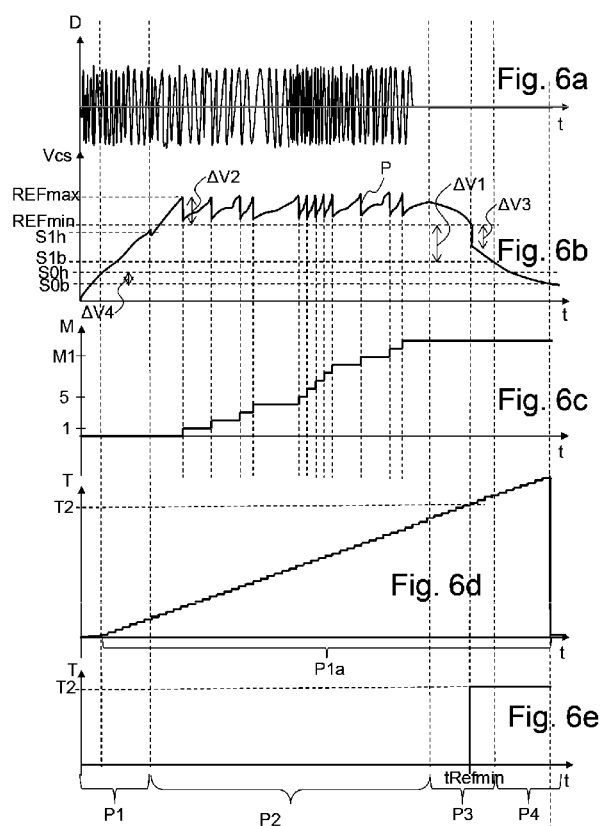

[Fig 7]
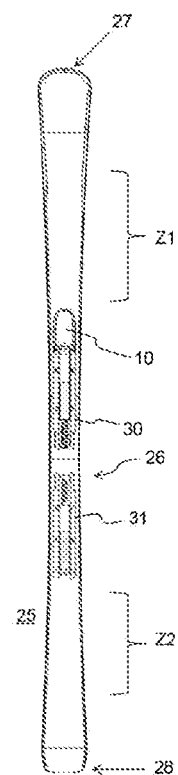

[Fig 8]
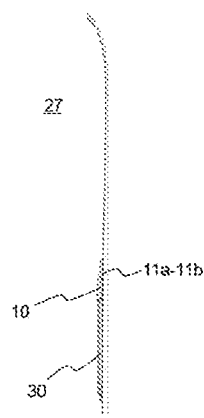

[Fig 9]
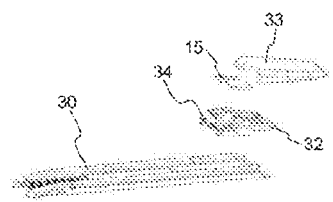

[Fig 10]
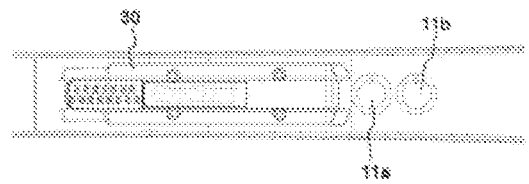

[Fig 11]
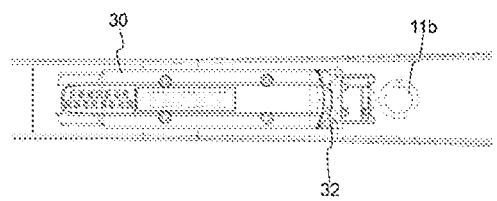

[Fig 12]
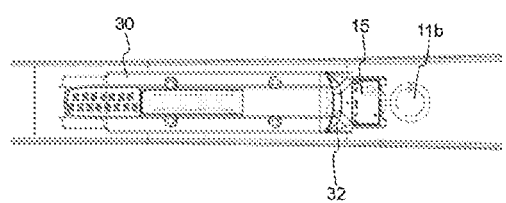

[Fig 13]
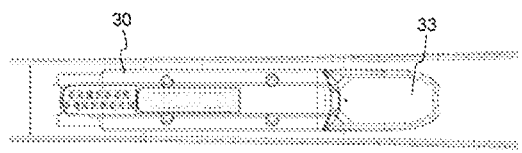

[Fig 14]
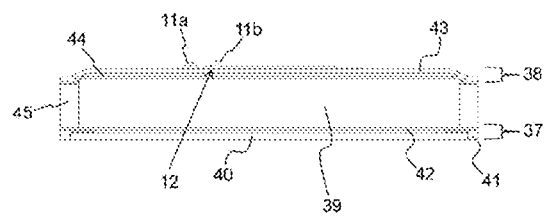

[Fig 15]
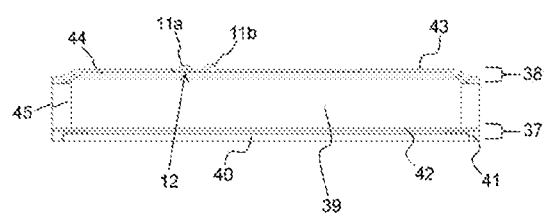

SYSTEM FOR ANALYSIS OF THE PERFORMANCE IN USE OF A SLIDING BOARD

TECHNICAL FIELD

The invention relates to the domain of boards for sliding on snow or on water, and in particular downhill, cross-country or touring skis, or even snowboards and wakeboards.

The invention relates more particularly to a system for the analysis of the performance in use of a sliding board, i.e. a system able to indicate to a user of a sliding board if it meets objective performance criteria.

PRIOR ART

There are a large number of devices making it possible to estimate the performance of a user of a sliding board. For example, French patent application FR 2 891 998 proposes using a position sensor, integrated in an item of ski clothing, to characterize a skier's performance based on the speed at which the skier moves.

In addition, several mobile applications have been developed in recent years to measure and compare the performance of different skiers from a ski resort. These applications use the mobile's inertial sensor or gyroscope to estimate the skier's speed. A centralized database gathers the performance of the different skiers and enables a skier's mobile application to compare the measured performance with the performance of other skiers.

However, it is insufficient to measure the speed of a skier in order to characterize their performance. Indeed, for the purposes of the invention, a skier's "performance" reflects not only the skier's speed but also their technique.

In order to estimate a skier's technique, there is the PIQ product from the applicant.

This PIQ product corresponds to a sensor mounted on a ski boot and configured to measure the power applied by the skier at each turn. The sensor communicates with the skier's smartphone so as to measure a large number of parameters during the skier's descent by combining the measurements originating from the sensors of the telephone with those of the PIQ sensor. The mobile application provided with the PIQ product makes it possible to compare the performance of several skiers by transmitting their performance to a database.

However, the PIQ sensor has particularly high energy consumption since it has to power, over a whole day of skiing, the means for measuring power and the means for wireless communication with the smartphone. For this purpose, the PIQ sensor integrates a battery and it is provided with a module for recharging this battery. Thus, it is not possible to integrate the PIQ sensor in a lasting manner in a boot or in a ski, since the user is obliged to regularly recharge the PIQ sensor.

Moreover, it is known from U.S. Pat. No. 5,590,908 to measure the deformation of a sliding board by means of a piezoelectric sensor in order to obtain information on the points of contact of the sliding board with the snow.

From patent EP 0,841,969 it is also known to use piezoelectric sensors for damping vibrations of a sliding board.

This type of sensor uses the intrinsic behavior of a piezoelectric element which converts mechanical energy of deformation into electrical energy.

To analyze the deformations of a sliding board using a piezoelectric sensor, it would be necessary to use a continuously powered electronic analysis circuit.

Thus, it is necessary to use an electrical energy source providing a constant voltage, such as an electrochemical battery or any other known means.

However, an electrochemical battery has constraints on size and weight, cold resistance and storage, which are not generally compatible with a sliding board. In fact, a sliding board on snow can be used at temperatures near −20° C. In this operating temperature range, conventional electrochemical batteries perform poorly or are even unusable. Further, batteries discharge quickly in the cold and batteries must be replaced or recharged by the user often, which is very constraining. Further, a sliding board on snow is often used occasionally, for example a few days each winter.

An electrochemical battery installed on a sliding board on snow would therefore have long periods of inactivity, at least between the spring and the fall, during which the electrochemical battery would be completely discharged. Further, a sliding board is a mechanical element undergoing significant stresses, such as torsion or impact.

The concrete applications involving the use of an electronic circuit and piezoelectric element installed on a sliding board are therefore limited and the large majority of measuring devices existing in other fields of application are not transposable on a sliding board because of these specific constraints.

The document WO 2011/160040 describes a skateboard deck with electroluminescent diodes disposed on the board for displaying light effects on the ground.

The supply for the diodes is normally done by a battery but an embodiment proposes using a piezoelectric transducer for powering these electroluminescent diodes. Other than this display device, this document also proposes incorporating an electronic circuit on the skateboard deck in order to make measurements over time. This electronic circuit is powered by a battery and can incorporate a movement sensor such as previously described, meaning a piezoelectric sensor using a deformation measurement coming from a piezoelectric element.

However, the teaching from that document is not suited to the domain of boards for sliding corresponding to the invention, meaning boards for sliding on snow or on water, and in particular downhill, cross-country or touring skis, or even snowboards and wakeboards. In fact, for these sliding boards, the lower surface of the sliding boards is intended to come in contact with the surface on which the board progresses, unlike a skateboard. It is therefore not useful to place luminescent elements on the sliding board from the invention because these elements would not be visible. Further, this document only describes a conventional method for supplying the electronic circuit doing the measurements, meaning the use of a battery.

The technical problem addressed by the invention is therefore that of finding how to analyze the performance of a user of a sliding board by obtaining information linked to the use of a sliding board while dispensing with an additional power source, and in particular an electrochemical battery.

DISCLOSURE OF THE INVENTION

The invention proposes to solve this technical problem by using a sensor comprising at least one piezoelectric element secured to a sliding board and by using this piezoelectric element to supply an electronic processing circuit of the sensor, making it possible to estimate a duration of the phases of deformation of the sliding board and an image of the mechanical energy dissipated during the deformations of said sliding board.

To this end, the invention relates to a system for analysis of the performance in use of a sliding board comprising:
- a database storing baseline performance;
- a sensor sensitive to the deformations of said sliding board; and
- a monitoring body comprising:
  means for determining the performance in use of said sliding board based on measurements from said sensor; and
  means for comparing said performance in use with said baseline performance.

The invention is characterized in that said sensor is secured to said sliding board and comprises:
- at least one piezoelectric element secured to said sliding board and configured to generate electric energy during the deformations of said sliding board; and
- an electronic processing circuit, powered exclusively by said electric energy generated by said at least one piezoelectric element, configured to estimate a duration of the phases of deformation of said sliding board and to estimate an image of the mechanical energy dissipated during the deformations of said sliding board;
- said performance in use including a stressing time, corresponding to said duration of the phases of deformation of said sliding board, and an image of the mean stressing power corresponding to the relationship between the image and said duration of the deformation phases; said baseline performance being determined by a sensor, analogous to said sensor secured to said sliding board, so as to obtain a baseline stressing time and a baseline stressing mean.

The invention thus makes it possible to obtain two items of information, the stressing time and the mean stressing power, linked to the use of a sliding board, while dispensing with an additional source of power, and in particular an electrochemical battery.

A user of a sliding board may reset this information to zero before a descent and recover the information acquired following the descent. The user preferably has a mobile application and a smartphone configured to work with the sensor secured to the sliding board. Any other appliance similar to a smartphone could be used in place of this smartphone, such as for example a connected watch or a connected object positioned on, or integrated in, an item of clothing. For example, the sensor may integrate a radio frequency antenna intended to cooperate with an antenna of the smartphone via the NFC (Near Field Communication) protocol. According to one embodiment, said monitoring body is integrated into a mobile application of a smartphone.

This technology makes it possible to use the electromagnetic power of the radio frequency signal emitted by the smartphone to power the sensor and write or recover information contained in a chip.

Additionally, this information can be correlated with other information acquired by the smartphone or a similar device which includes other types of sensors, independent of the sensor secured to the sliding board.

According to one embodiment, said performance in use includes a speed measured by a position sensor; this measured speed being compared to a baseline speed. A position sensor may correspond to a GPS (Global Positioning System) type sensor.

According to one embodiment, said performance in use includes a number of turns made detected by a gyroscope; this number of turns made being compared to a baseline number of turns made. As a variant or in addition, the number of turns can be determined by other components of a smartphone, such as an accelerometer or a magnetometer.

Thus, using the position sensor and the gyroscope of the smartphone, it is possible to compare the stressing time, the mean stressing power, the speed and the number of turns made by a user of a sliding board relative to another baseline user whose performance is stored in a database.

The baseline user preferably corresponds to a professional or to an expert skier who takes a predetermined route with a desired level of mastery. For example, in order to determine if a skier is correctly descending a beginner's run with the snowplow technique, it is insufficient to analyze the speed of descent or the number of turns since a user can descend a run very quickly without mastering the turns or they can make a large number of turns without mastering the pushing power in each turn to guarantee their stability.

In order to detect this missing mastery, a professional equipped with the invention takes the beginner's run before the skier, using the snowplow technique, and descending the run slowly with the turns correctly pushed into.

Following the professional's descent, the professional's performance is sent to the database, via their smartphone and the mobile application forming the monitoring body. For this purpose, the mobile application preferably comprises data processing means, for forming baseline performance.

Following this phase of recording baseline performance, a user equipped with the invention can take the same run and the monitoring body can compare their performance with that of the baseline user.

Preferably, said monitoring body is configured to authorize access to a high-level route when said stressing time is less than a baseline stressing time and when said mean stressing power is greater than a baseline mean stressing power. With this embodiment, the comparison of the skier and the baseline professional makes it possible to indicate the skier's skiing level to them, to advise them to continue to practice on the run that has already been carried out, or to indicate to them that they can ski on a more difficult run. This comparison can also make it possible to automatically authorize access to certain runs of a ski area such that the users of a run are sure to have the necessary skills to take the run.

With this in mind, the monitoring body can be installed at the entrance to a ski lift access area instead of being carried on a smartphone of the user of the sliding board. Before being able to access a ski lift leading to a run of a particular difficulty, for example a black run, the user must then place their ski in front of the reader, such that the reader recovers the performance information linked to a previous descent of a lower level, for example a red run.

If the user has the required qualities, i.e. they exceed the criteria required by the baseline performance, at least in terms of descent time and mean stressing power, then they are able to access the black run.

Additionally, the skier's fee can be automatically updated by recording the access rights in a radio frequency tag in order to authorize the next requests to access this difficulty level. On the other hand, if the user does not exceed the required criteria, access to the run can be refused to them.

Of course, this embodiment can also be implemented with a larger number of criteria. For example, in one embodiment, said monitoring body is configured to authorize access to a high-level route when said speed and said number of turns made are greater than said baseline speed and than said baseline number of turns made.

The invention also enables many other novel uses. For example, in one embodiment, said monitoring body is configured to classify a user of a sliding board in relation to classifications of predefined levels based on said comparison carried out by said monitoring body. This embodiment makes it possible to supply a classification of a skier in recognized categories, such as grades 1, 2, 3 and 4 as created by the Ecole du Ski Français [French Ski School], for example. In this case, grade 1 corresponds to the beginner's level, while grade 4 corresponds to the competition level.

It is also possible to compare users with one another in a video game environment wherein the users compete against one another using their actual performance.

However, the two users may have different equipment, and the capacities of the sliding board, and in particular the capacities thereof in terms of flexion, can cause the performance sensed by two identical sensors mounted on two discrete sliding boards to vary. In order to solve this problem, one solution consists of comparing performance in use corrected based on a variable relating to a particular flexural rigidity of each sliding board To this end, according to one embodiment, said means for determining the performance in use are configured to determine corrected performance in use based on said performance in use and on a variable related to a flexural rigidity of said sliding board; said means for comparing being implemented from said corrected performance in use.

For example, said variable related to a capacity of deformation of said sliding board can be obtained from the model of said sliding board and from a database storing different models of sliding boards and corresponding flexural rigidity coefficients. The model of the sliding board can be entered directly in the mobile application of a smartphone or a similar device. As a variant, this model can be sensed by the smartphone by scanning a tag arranged on the sliding board wherein the name of the model or a model reference is stored.

In addition, variations in the flexion of the sliding board can also arise due to the size of the user's boot, since, for the same sliding board, the length of the beam that is free in terms of flexion varies between two boot sizes. Thus, the variable relating to a capacity of deformation of said sliding board can also be determined based on a shoe size entered in the mobile application of a smartphone.

This variable relating to the boot size may also make it possible to correct the performance in use recorded by the user.

Other variations appear due to variations in the substrate on which the two users are progressing.

Indeed, between two periods of the year and between two different moments of the same day, the texture of the snow changes and the information obtained by the sensor of the invention may be quite different for the same user.

To overcome this problem, said means for determining the performance in use are configured to determine corrected performance in use based on said performance in use and on a variable related to the type of snow over which said sliding board is progressing; said means for comparing being implemented from said corrected performance in use.

For example, said variable related to the type of snow over which said sliding board is progressing is obtained from a temperature sensor. Preferably, the temperature sensor is integrated in a smartphone.

As a variant, said variable related to the type of snow over which said sliding board is progressing is obtained from a position sensor and from a database storing weather information related to different positions.

BRIEF DESCRIPTION OF THE FIGURES

The way to practice the invention, and also the advantages which followed there from, will emerge clearly from the description of the following embodiments, with the support of the attached figures in which:

FIG. 1 is a schematic depiction of a system for analysis of the performance in use of a sliding board according to one embodiment of the invention;

FIG. 2 is a flow chart of the steps of recording and comparing performance in use acquired with the analysis system of FIG. 1;

FIG. 3 is a wiring diagram of a sensor mounted on the sliding board of FIG. 1 according to a first embodiment;

FIG. 4 is a wiring diagram of a sensor mounted on the sliding board of FIG. 1 according to a second embodiment;

FIGS. 5a to 5e are temporal representations of acquisition of various parameters, produced using the sensor of FIG. 3, wherein FIG. 5a shows the deformations of the sliding board (D), FIG. 5b shows the voltage at the terminals of the capacitive storage element, FIG. 5c shows a duration (T) of the phases of deformation, and FIGS. 5d and 5e show an image (M) of the mean power of the phases of deformation recorded in a buffer memory and in the nonvolatile memory;

FIGS. 6a to 6e are temporal representations of acquisition of various parameters, produced using the sensor of FIG. 4, wherein FIG. 6a shows the deformations of the sliding board (D), FIG. 6b shows the voltage at the terminals of the capacitive storage element, FIG. 6c shows a duration (T) of the phases of deformation, and FIGS. 6d and 6e show an image (M) of the mean power of the phases of deformation recorded in a buffer memory and in the nonvolatile memory;

FIG. 7 is a top view of a sliding board in accordance with the invention;

FIG. 8 is a side view of the front part of the sliding board from FIG. 7;

FIG. 9 is an exploded perspective view of the front elements brought onto the sliding board from FIG. 7;

FIG. 10 is a partial top view of the sliding board from FIG. 7 in a first position for mounting the sensor;

FIG. 11 is a partial top view of the sliding board from FIG. 7 in a second position for mounting the sensor;

FIG. 12 is a partial top view of the sliding board from FIG. 7 in a third position for mounting the sensor;

FIG. 13 is a partial top view of the sliding board from FIG. 7 in a fourth position for mounting the sensor;

FIG. 14 is a vertical sectional view of the sliding board from FIG. 7 according to a first embodiment of the invention; and FIG. 15 is a vertical sectional view of the sliding board from FIG. 7 according to a second embodiment of the invention.

Of course, the dimensions and proportions of some elements constituting the invention have been deformed, exaggerated and/or separated from reality for the purpose of making the invention well understood.

METHOD FOR IMPLEMENTING THE INVENTION

FIG. 1 shows a system for analysis 200 of the performance in use of a sliding board 25. In the remainder of the description, the sliding board 25 corresponds to a ski.

Of course, other sliding boards can be used without changing the invention, in particular such as cross-country skis or snowboards which accommodate both the user's feet on the same board.

The sliding board 25 is fitted with a sensor 100 and a wireless transmission system, which may be a radio frequency tag 221 or a Bluetooth system. The skier carries a smartphone 203 able to communicate with the sensor 100 and the tag 221 using radio frequencies. For example, the smartphone 203 may comprise an NFC chip 206 (Near Field Communication), making it possible to use electromagnetic waves to power the sensor 100 or the tag 221 and to receive information contained in a chip 19 inside the sensor 100 or the tag 221. In the case of use of a Bluetooth system at the sensor, this Bluetooth system is powered by the piezoelectric element positioned on the sliding board.

The tag 221 solely aims to transmit information about the model of the sliding board 25, whereas the sensor 100 makes it possible to transmit information relating to the deformations experienced by the sliding board 25 during a descent.

The NFC chip 206 of the smartphone 203 is connected to a monitoring body 204. For example, the monitoring body 204 may correspond to a mobile application running on a processor integrated in the smartphone 203. This monitoring body can also comprise remote functions ported and processed on a remote server.

This monitoring body 204 is also connected to other smartphone chips, such as a GPS chip 207 (Global Positioning System), making it possible to determine the position and the trajectory of the smartphone 203 over time, or a gyroscopic chip 208, making it possible to indicate the angular displacements of the smartphone 203 to identify the turns or even a temperature sensor 209, making it possible to sense the external temperature around the smartphone 203.

Other sensors, such as an accelerometer, a magnetometer, a barometer, or even a camera, could also be connected to this monitoring body in order to perform more complete analyses.

The main function of the monitoring body 204 is to compare the performance acquired during a descent of the skier with baseline performance stored in a database 202. This database 202 may be hosted on a server 201 of a winter sports equipment manufacturer or in a ski resort. In order to communicate with the server 201, the smartphone 203 preferably uses a wireless data transmission network, such as the WiFi, 3G, 4G, or 5G networks. In the example of FIG. 1, the smartphone 203 uses a 4G chip 205 to communicate with the server 201.

Additionally, the smartphone 203 is also connected to a weather server 222, such that the smartphone 203 can obtain information about the weather based on the position of the skier Coord transmitted to the weather server 222. This position of the skier Coord is preferably obtained by the GPS chip 207.

This analysis system 200 makes it possible to compare the performance of the skier with that of a baseline skier. To this end, as shown in FIG. 2, the same route X will be taken by a baseline skier, who may be a professional, and also by the skier, at a different time to the baseline skier. Before taking the route X, it is necessary to reset the data of the sensor 100 positioned on the ski, to zero, both for the baseline skier and for the skier. More specifically, this resetting to zero is carried out by tagging the sensor 100 with the smartphone 203. Next, the start of recording data in the sensor 100 is automatic as soon as the baseline skier or the skier starts their route X given that the sensor 100 only records the data when the ski is statically and/or dynamically deformed.

In a first step 300, the baseline skier or the professional chooses a route X. Before starting the route X, in a step 301, the professional resets to zero the sensor 100. To this end, the professional can use their smartphone 203 to communicate with a nonvolatile memory 19 integrated in the sensor 100, so as to reset to zero an item of information relating to a duration T of the phases of deformation of their sliding board 25 and an item of information about an image M of the mechanical energy dissipated during the deformations of the sliding board 25. When this information T, M is reset to zero, the professional can carry out the descent of the route X, in a step 302. During the descent, the professional must take care to descend the route X, pushing into the turns with a level suited to the level of the route X, so as to obtain suitable trajectories and mean pushing forces on the skis and consequently, a time of use or completion of the route X and also a mean power which are representative of the level corresponding to the route X.

At the finish of the route X, in a step 303, the professional scans the sensor 100 by means of the smartphone 203 so as to recover the data T and M estimated by the sensor 100 and the monitoring body 204 determines the two items of information Tref and Pref from this data T and M. In the case of use of a Bluetooth system on the sliding board, the data T and M is transmitted automatically to the monitoring body 204.

The duration Tref corresponds directly to a time count T obtained by the sensor 100, while the image Pref of the mean stressing power is determined by the relationship between an activation count M and the time count T of the stressing phases estimated by the sensor 100.

Aside from this information T and M, a step 304 can also be implemented to recover contextual data, such as the model of the professional's skis or the type of snow on which the professional carried out the descent of the route X.

The route X may be part of an area of marked runs, each of the runs representing a ski level with specific exercises corresponding to this level, the run generally being equipped with gate poles, forming a specific route, making it possible to set the type of turns to be carried out.

The route X may also correspond to a free run, i.e. to any run located in the ski resort not equipped with gate poles, the run being nonetheless referenced by its gradient, and in particular, as is known, by the colors green, blue, red and black, ranging from the least steep slope, corresponding to the least technical run, to the steepest slope, corresponding to the most technical run. Regarding the exercises proposed on free runs, they may comprise tight turns or wider turns, straight lines or traverses, or exercises of the skate skiing type, or any other type of exercise that is important when learning to ski.

In order to detect the model, the professional may simply scan the tag 221 present on the sliding board 25, which contains information about the model. As a variant, they may enter this model into a mobile application of the smartphone 203.

Regarding the type of snow, it may be characterized based on the weather information transmitted by the server 221 based on the coordinates Coord of the professional, or it may be determined based on the temperature measured by the temperature sensor 209. Aside from this contextual data, step 305 proposes optionally also to recover data collected during the descent by the professional by means of sensors integrated in the smartphone 203. For example, this step 305 may recover a speed Vs measured by the position sensor 207 or a number of turns Ns carried out and detected by the gyroscope 208. Of course, other sensors from the smartphone 203 may be used, such as an accelerometer, a magnetometer, a barometer or else a camera integrated in the smartphone 203.

As a variant and additionally, data may also be captured during the descent by other devices connected to the smartphone 203, such as a connected watch, a sensor integrated in the professional's clothing, or a camera attached to the professional in an area close to their center of gravity.

Typically, an accelerometer makes it possible to obtain information about the momentum experienced by the professional in the turns, a magnetometer used as a compass makes it possible to detect directional variations of the professional, a barometer makes it possible to precisely detect the changes in elevation experienced by the professional and a camera makes it possible to record an image of the professional's skis throughout the descent in order to evaluate the skier's ability to maintain their skis parallel, in particular.

In a step 306, all this data is recorded in the database 202 in order to form a baseline performance (Tref, Pref, Vref, Nref . . . ) of the route X, provided by the baseline skier.

Thus, when a skier uses a similar system 200, they can reproduce the same steps 300 to 305 and obtain a comparable performance to that of the professional for the same route X. If the route X corresponds to a free run, the mobile application indicates to the skier the level of the run to descend (green, blue, red, black), and also the exercise to be carried out. If the route X is plotted on a marked run, the exercise to be carried out is associated with the run.

In order to effectively compare the skier's performance with that of the professional, it is preferable to correct the skier's performance Ts, Ps, Vs, Ns based on the disparities between the professional's contextual data and that of the skier.

To this end, the difference in flexural rigidity between the professional's ski model and the skier's ski model is determined from a database 220 hosted on the server 201 or on an external server. This database 220 integrates connections between ski models and coefficients of rigidity. The difference between the two coefficients of rigidity of the two ski models makes it possible to obtain a variable $\alpha m$ related to a flexural rigidity of the skier's skis. This variable $\alpha m$ can also be determined based on a difference in shoe size between the professional and the skier.

The skier's performance Ts, Ps, Vs, Ns can also be corrected by a variable $\alpha n$ related to the difference between the hardness of the professional's snow and the hardness of the skier's snow.

In order to determine this variable $\alpha n$, the monitoring body 204 can ask the weather server 222 in order to obtain an estimate of the hardness of the snow based on the skier's position.

As a variant, the hardness of the snow can be determined from a measurement by a temperature sensor 209, in particular integrated in the smartphone.

With these different possible corrections, step 307 makes it possible to obtain corrected performance Tsc, Psc, Vsc, Nsc enabling a better comparison with the baseline performance Tref, Pref, Vref, Nref acquired by the professional. Thus, in a step 308, the comparison is carried out for all the measured and comparable performance.

The result of this comparison can be utilized in different ways without changing the invention. For example, as illustrated in FIG. 2, if the comparison shows that the skier has exceeded the performance Tref, Pref, Vref, Nref of the professional, that is to say:
  if the duration of the phases of deformation Tsc of the skier is shorter than the duration of the phases of deformation Tref of the professional; and
  if the mean stressing power Psc of the skier is greater than the mean stressing power Pref of the professional, and
  if the speed Vsc of the skier is greater than the speed Vref of the professional, and if the number of turns Nsc of the skier is greater than the number of turns Nref of the professional,
  then the skier can be considered to have successfully completed the route X and is authorized to move on to a more difficult route, in a step 309. Otherwise, the skier may be guided to redo the route X.

A simpler comparison can be carried out solely using the performance criteria Tsc and Psc, compared to Tref and Pref. Moreover, a more in-depth comparison can be carried out by adding to the criteria Ts, Ps, Vs and Ns other criteria, taken alone or in combination, which may result from sensors of the accelerometer, magnetometer, barometer or even camera type.

The comparison between the skier's performance and the professional's, i.e. the baseline skier's, performance, can also be used to determine the skier's level and in order to subsequently advise them in their ski learning by indicating to them the most suitable marked route X, or else by indicating to them the type of specific exercises to be carried out on a free run, or else by recommending to them a ski class suited to their level, in a ski school, or even by recommending to them a ski model suited to their skiing level. The comparison can also be used to enter recorded data into a video-game application.

In order to determine the level of a skier, aside from the elements described above, the monitoring body 204 can make use of processing and classification or regression algorithms based on supervised learning, such as decision trees or neural networks. To this end, the classification model must be constructed using a learning phase with skiers of several levels, evaluated by professionals, for whom at least the performance Tref, Pref as well as the baseline speed Vref will be recorded. The recording of other parameters such as the number of turns Nref, or even the baseline performance originating from accelerometers and/or a magnetometer, will make it possible to give more precise information regarding the different types of skiers. Thus, a classification of the skiers by level will be able to be constructed in a database by defining thresholds for the different levels of the skiers.

In other words, in order to evaluate the skier's level, it is conceived to propose that they carry out a route X of average difficulty, then to compare their recorded and corrected performance Tsc, Psc, or even also Vsc, Ns, with the thresholds established for each of the level-based grades (corresponding for example to grades 1 to 4 of the ESF) and recorded in a database.

The analysis of the skier's performance Ts, Ps and Vs makes it possible to easily position the skier in a level-based grade to define the skier's level.

The analysis of the skier's performance Ts, Ps and Vs, to which other elements of the skier's performance are added, such as the number of turns Ns, or the data originating from a magnetometer or even the data originating from accelerometers, make it possible to position the skier in a sub-class of a level-based grade in order to establish, with a very high level of precision, the skier's level.

More specifically, comparing the recorded and/or corrected performance of the skier by combining the recorded speed parameter Vs or Vsc makes it possible to define the level of the skier within a grade.

The additional analysis of one of the following parameters

For the purposes of the invention, the comparison must at least be carried out with data integrating a duration Ts of the phases of deformation and an image Ps of the mean stressing power of the skier's sliding board 25. The duration Ts corresponds directly to a time count T obtained by the sensor 100, while the image Ps of the mean stressing power is determined by the relationship between an activation count M and the time count T of the stressing phases estimated by the sensor 100. During the calculation of the relationship Ps between M and T, a multiplier coefficient can be applied to the activation count M.

FIGS. 3 and 4 show two embodiments of an electrical drawing of a sensor 100 of a use of a sliding board 25 making it possible to measure the information T and M. This sensor 100 is secured to a sliding board 25 as will be shown in FIGS. 7 to 15.

According to these two embodiments, the sensor 100 comprises, on the one hand, at least one element intended to produce the electric energy following a deformation, such as a piezoelectric element 11a, 11b, and, on the other hand, an electronic processing circuit 15. The electronic processing circuit 15 comprises a portion relating to the storage and management of electric energy 101, and also a portion 102 relating to the determination of the at least one information related to the use of the sliding board 25, where this portion 102 comprises elements providing estimates and calculations related to the use of the sliding board 25.

In order to store the information related to the use of the sliding board 25, the electronic processing circuit 15 further comprises a portion 103 relating to the storage of the data. And finally, in order to assure communication of this recorded data to a device external to the sensor 100, the electronic processing circuit 15 comprises a portion 104 relating to communication.

In a manner shared by the two embodiments, the sensor 100 comprises at least one piezoelectric element 11a, 11b; here there are two. The piezoelectric elements 11a, 11b are not directly connected to each other. The piezoelectric elements 11a, 11b can be arranged electrically in parallel. Alternatively, the piezoelectric elements 11a, 11b are arranged electrically in series with respect to each other.

Both piezoelectric elements 11a, 11b are intended to generate an electrical signal during use of the sliding board 25. More specifically, each piezoelectric element 11a, 11b generates a voltage Vpa, Vpb in response to a mechanical deformation that it experiences. In the presence of several piezoelectric elements 11a, 11b this voltage Vpa, Vpb can vary from one piezoelectric element 11a, 11b to the other.

The electronic processing circuit 15 is powered solely by piezoelectric elements 11a, 11b. Thus, the sensor 100, itself forming an electronic circuit composed of piezoelectric elements 11a, 11b and also the electronic processing circuit 15, is autonomous, meaning that it does not require a power source outside the sensor 100, such as, for example, a rechargeable or ordinary battery.

In other words, the piezoelectric elements 11a, 11b play both the role of information source for determining the use of the sliding board 25 and the role of electric power source, as will be described later.

The voltage Vpa, Vpb generated by each piezoelectric element 11a-11b is an alternating, not direct, current which has large variability in amplitude and frequency.

As shown by FIGS. 5a and 6a, during a phase P1, called start up, and during a phase P2, called writing, the sliding board 25 deforms in flexion when it is used and a surface 12 of the sliding board then experiences deformations transmitted to the piezoelectric elements 11a-11b that generate a voltage Vpa, Vpb that varies depending on the deformations experienced by the surface 12. During a phase P3, called stoppage, and during a phase P4, called extinction, the sliding board 25 is stopped and, because of that, it is no longer deformed, also the surface 12 no longer experiences deformations and the voltage Vpa, Vpb generated by the piezoelectric elements 11a, 11b becomes zero.

In a way common to both embodiments, the portion relating to the storage and management of electric energy 101 comprises at least one voltage converter 14, at least one capacitive storage element Cs and at least one voltage comparator 22.

The voltage Vpa, Vpb, intrinsically variable, is injected into a voltage converter 14 which provides a rectified or direct voltage from the voltage Vpa, Vpb generated by each piezoelectric element 11a, 11b.

According to both embodiments, this voltage converter 14 is made of a diode bridge which supplies a rectified voltage.

According to an implementation variant, the voltage converter 14 is made by a "buck" type, "boost" type or "buck-boost" type clipper; these clippers have the advantage of providing a direct voltage. It should be noted that each piezoelectric element 11a-11b is connected without intermediate element to the voltage converter 14. In the case where the piezoelectric elements 11a, 11b are arranged electrically in series or in parallel, it is advantageous to provide a single voltage converter 14, which can result in a non-negligible production savings.

At the output of the voltage converter 14, the voltage Vpa, Vpb generated by the piezoelectric elements 11a-11b is stored in a capacitive storage element Cs of super capacitor or condenser type. The capacitive storage element Cs can comprise several super capacitors or condensers without changing the invention. In the scenario where several condensers are used, they are disposed electrically in parallel with each other, with the sum of the capacitance of each condenser equal to the equivalent capacitance of the collection of condensers.

FIGS. 5b and 6b show the voltage Vcs at the terminals of the capacitive storage element Cs. In the initial state, meaning when the sliding board 25 is not used, the capacitive storage element Cs is completely discharged. In the starting P1 and writing P2 phases, the sliding board 25 is in use and deforms under flexion, in particular on snow. In the starting P1 and writing P2 phases, the deformations of the sliding board 25, and therefore the surface 12 allow charging the capacitive storage element Cs by means of the piezoelectric elements 11a, 11b.

Since the sliding board 25 is not stressed during the shutdown P3 and extinction P4 phases, the capacitive storage element Cs discharges. The portion 101 relating to electric energy storage and management further comprises at least one voltage comparator 22, 22a configured for controlling the supply of power to the portion 102 relating to the determination of at least one information related to the use of the sliding board 25.

For this purpose, the voltage comparator 22, 22a is configured for comparing the voltage Vcs at the output of the capacitive storage element Cs with two threshold voltage values S1h, S1b, S0h, S0b, as will be described later in connection with FIGS. 5b and 6b.

In a way common to both embodiments, the voltage comparator 22 is connected both to the capacitive storage element Cs by a supply terminal Vdc, to a switch 21 on output, to one or more resistances R1, R2 and R3 on the positive terminal thereof and to a baseline voltage F on the negative terminal thereof. Advantageously, a signal inverter 10 is arranged at the output of the voltage comparator 22. It should be noted that the switch 21 is, for example, a PMOS type transistor. Of course, this switch 21 can also be a NMOS type transistor and, in that case, the architecture of the electronic processing circuit 15 would need to be adapted.

Further, the portion 103 relating to data storage comprises at least one nonvolatile memory 19, as will be described later. It should be noted that memory is called nonvolatile when the loss of power does not cause the loss of stored data.

As for the portion 104 relating to communication, it comprises an antenna 20, which will also be described later in the description.

According to the first embodiment shown in FIG. 3, the electronic processing circuit 15, and in particular the portion 102 thereof relating to the determination of at least one item of information related to the use of the sliding board 25, comprises a microcontroller 18.

The microcontroller 18 implements binary counts T, M and is configured to compare the supply voltage thereof against at least one baseline voltage value REFmax, REFmin. According to this embodiment, the microcontroller 18 implements two binary counts, one temporal binary count T corresponding to a length of use of the sliding board 25 and a binary count M called activation count, which is going to represent information related to the amplitude of the deformations of the sliding board 25.

In other words, according to this embodiment, the microcontroller 18 estimates both a length of use and an amplitude of deformations of the sliding board 25.

It should be noted that according to this embodiment, a single voltage comparator 22 is provided. This voltage comparator 22 implements the comparator function with hysteresis with which to close or open the switch 21 in order to connect, respectively disconnect, the microcontroller 18 to the capacitive storage element Cs. To do that, two thresholds are defined S1h and S1b, respectively called in the remainder of the description supply threshold S1h and cutoff threshold S1b. In other words, this voltage comparator 22 is configured for controlling the supply of the microcontroller 18 depending on the supply threshold S1h and cutoff threshold S1b.

When the voltage Vcs at the terminals of the capacitive storage element Cs reaches the supply threshold S1h, the output of the voltage comparator 22 goes to the high state.

This inverted signal controls the switch 21, which by closing, connects the capacitive storage element Cs to the microcontroller 18.

In FIG. 5b, after having reached the supply threshold S1h, the voltage Vcs drops slightly in response to powering the microcontroller 18.

At the end of the stresses on the sliding board 25 (phases P3, P4), a discharge of the capacitive storage element Cs appears because the piezoelectric elements 11a, 11b are no longer supplying the capacitive storage element Cs. Because of the positive feedback of the resistances R1, R2 R3 on the voltage comparator 22, the cutoff threshold S1b is set at a voltage value equal to $S1b=S1h-\Delta V1$ where $\Delta V1$ represents the hysteresis generated by placing the resistances R1 and R3 in parallel.

Thus, when the voltage Vcs at the terminals of the capacitive storage element Cs goes below the cutoff threshold S1b, the output of the voltage comparator 22 goes back to the low state, allowing the opening of the switch 21 and disconnecting the capacitive storage element Cs from the microcontroller 18.

Hereinafter, the operating method for the portion 102 relating to the determination of at least one item of information related to the use of the sliding board 25 will be described according to the first embodiment from FIGS. 5a, 5b, 5c, 5d and 5e.

Once the microcontroller 18 is powered and the piezoelectric elements 11a, 11b continue to supply the capacitive storage element Cs (phase P2) with electric energy, the voltage Vcs then reaches a maximum baseline value REFmax. When the voltage Vcs reaches maximum baseline value REFmax, the microcontroller 18 is configured to increment the activation count M and write it in the nonvolatile memory 19, as shown in FIG. 5c. This incrementing and also this writing in memory of the activation count M consumes energy represented by a voltage drop $\Delta V2$ in FIG. 5b. According to this operating method, the activation count M, representing the mechanical energy imposed on the sliding board 25, is incremented by the value 1 each time the maximum baseline value REFmax is reached by the voltage Vcs, as is shown by FIG. 5c.

In other words, the activation count M counts the number of peaks P where the voltage Vcs reached the maximum baseline value REFmax during the length of use of the sliding board 25.

The more these peaks P are packed together, the more the sliding board 25 is being stressed by the user; and the more the peaks P are separated, the less the sliding board 25 is being stressed by the user.

According to this embodiment, the time count T is determined by an internal clock of the microcontroller 18 which is activated when the microcontroller 18 is powered on, as shown in FIG. 5d. In other words, the time count T starts once the voltage Vcs reaches the supply threshold S1h.

When the flexions of the sliding board 25 are interrupted, the piezoelectric elements 11a, 11b stop supplying electric energy to the capacitive storage element Cs whose voltage Vcs progressively decreases and goes past a minimum baseline value REFmin. According to the operating method, once the voltage Vcs reaches this minimum baseline value REFmin, the microcontroller 18 is configured for writing the time count T in nonvolatile memory 19.

It should be noted that writing this time count T leads to a voltage drop $\Delta V3$. In this first embodiment, the thresholds are defined such that:

$$S1b<S1h<REFmin<REFmax.$$

During the phases P2 and P3, the electronic processing circuit 15 performs at least one binary count T, M by using the voltage Vcs at the terminals of the capacitive storage element Cs.

During the phases P3 and P4, when the activity of the sliding board 25 is stopped, counting of the activation number M is automatically stopped since the maximum baseline value REFmax is no longer reached, whereas the counting of the length of use T by the microcontroller 18 is stopped at the end of the phase P3, and at the beginning of phase P4 when the voltage Vcs is less than or equal to the cutoff threshold S1b (FIG. 5d). However, according to this method of operation, the counting of the length of use T by the microcontroller 18 after the time tRefmin is not recorded in the nonvolatile memory 19 (see FIG. 5e).

When the voltage Vcs at the terminals of the capacitive storage element Cs reaches the cutoff threshold S1b, the microcontroller 18 is powered off and the data relating to the binary counts T and M remains in the nonvolatile memory 19 as is shown in FIGS. 5c and 5e.

Hereinafter, the elements specific to the second embodiment shown by FIG. 4 are detailed. According to this second embodiment, microcontroller 18 implements a single binary count, the activation count M. In other words, according to this embodiment, the microcontroller 18 estimates the amplitude of deformations of the sliding board 25.

In fact, the time count T is obtained by an oscillator 16 and a counter 17 which here are separate elements of the microcontroller 18.

The oscillator 16 delivers a periodic signal to the counter 17. With each period of the periodic signal from the oscillator 16, the counter 17 increments the time count T. For example, the oscillator 16 can be a quartz oscillator and the counter 17 can be implemented by placing a series of T flip-flops in cascade.

In this second embodiment, the oscillator 16 and the counter 17 are powered by the capacitive storage element Cs by means of a second voltage comparator 22a.

This second voltage comparator 22a, provided with an external reference Fa and surrounded by resistances R1a, R2a and R3a, implements the comparator with hysteresis function with which to close, respectively open, the switch 21a in order to connect, respectively disconnect, the oscillator 16 and the counter 17 to the capacitive storage element Cs.

To do that, two thresholds are defined S0h and S0b, respectively called in the remainder of the description counting threshold S0h and deactivation threshold S0b. In other words, the sensor 100, according to this second embodiment, comprises two voltage comparators 22, 22a, with a first voltage comparator 22 configured for controlling the power for the microcontroller 18 based on the supply threshold S1h and the cutoff threshold S1b and a second voltage comparator 22a configured for controlling the supply to the oscillator 16 and the counter 17 based on the counting threshold S0h and the deactivation threshold S0b.

In the second embodiment, the thresholds are defined such that:

$$S0b<S0h<S1b<S1h.$$

When the voltage Vcs at the terminals of the capacitive storage element Cs reaches the counting threshold S0h, the output of the second voltage comparator 22a goes to the high state, allowing the control of the switch 21a which, by closing, connects the capacitive storage element Cs to the oscillator 16 and to the counter 17. In FIG. 6b, after having reached the counting threshold S0h, the voltage Vcs drops slightly in response to the powering on of the oscillator 16 and of the counter 17. Starting from the counting threshold S0h, a counting phase P1a begins until the oscillator 16 and counter 17 are powered down.

As the stresses continue, the voltage Vcs at the terminals of the capacitive storage element Cs reach the supply threshold S1h, allowing powering of the microcontroller 18 through the first voltage comparator 22, as was previously described.

At the end of the stresses on the sliding board 25, a discharge of the capacitive storage element Cs appears because the piezoelectric elements 11a, 11b are no longer supplying the capacitive storage element Cs.

Thus, when the voltage Vcs at the terminals of the capacitive storage element Cs goes below the cutoff threshold S1b, the output of the first voltage comparator 22 goes back to the low state, allowing the opening of the switch 21 and disconnecting the capacitive storage element Cs from the microcontroller 18. Further, although the microcontroller 18 has been disconnected, the capacitive storage element Cs continues to discharge.

Because of the positive feedback of the resistances R1a-R3a on the second voltage comparator 22a, the deactivation threshold S0b is set at a voltage value equal to S0b=S0h−ΔV4 where ΔV4 represents the hysteresis generated by placing the resistances R1a and R3a in parallel.

Thus, when the voltage Vcs at the terminals of the capacitive storage element Cs goes below the cutoff threshold S0b, the output of the second voltage comparator 22a goes back to the low state, allowing opening of the switch 21a and disconnecting the capacitive storage element Cs from the oscillator 16 and counter 17.

The operating method for the portion 102 relating to the determination of at least one item of information related to the use of the sliding board 25 is next described according to the second embodiment using FIGS. 6a, 6b, 6c, 6d and 6e.

Once the oscillator 16 and the counter 17 are powered and the piezoelectric elements 11a, 11b continue to supply the capacitive storage element Cs with electric energy, the time count T is incremented and then stored in a buffer memory, meaning a temporary memory which clears when power is removed. The buffer memory changes at the frequency of the counter 17. In the same way as previously, once the microcontroller 18 is powered on (phase P2), the microcontroller 18 is configured to increment the activation count M and write it in the nonvolatile memory 19 as soon as the voltage Vcs reaches the maximum baseline value REFmax, as shown in FIG. 6c.

This incrementing and also this writing in memory of the activation count M consumes energy represented by a voltage drop ΔV2 in FIG. 6b.

When the flexions of the sliding board 25 are interrupted, the piezoelectric elements 11a, 11b stop supplying electric energy to the capacitive storage element Cs whose voltage Vcs progressively decreases and goes past a minimum baseline value REFmin.

Once the voltage Vcs reaches this minimum baseline value REFmin, the microcontroller 18 is configured to read the time count T written in the buffer memory and write it in nonvolatile memory 19. It should be noted that writing this time count T leads to a voltage drop ΔV3.

Further, in order to adapt the voltage levels between the counter 17 and the microcontroller 18, the electronic processing circuit 15 comprises buffers.

In the second embodiment, the thresholds are defined such that:

$$S0b<S0h<S1b<S1h<REFmin<REFmax.$$

During the phases P1, P2 and P3, the electronic processing circuit 15 performs at least one binary count T, M by using the voltage Vcs at the terminals of the capacitive storage element Cs. In the phases P3 and P4, when the activity of the sliding board is stopped, the counting of the stresses M is automatically stopped since the maximum baseline REFmax value is no longer reached, whereas the counting of the length of use T by the oscillator 16 and the counter 17 continues. When the voltage Vcs at the terminals of the capacitive storage element Cs reaches the cutoff threshold S1b, the microcontroller 18 is powered off and the data relating to the binary counts T, such as the length of use T2 and the number of activations M1, remain in the nonvolatile memory 19 as is shown in FIGS. 6c and 6e.

It should be noted that the length of use T2 is greater than the length of use T1 calculated with the first embodiment, because the counting by the counter 17 started running earlier.

The counting of the length of use T is stopped at the end of phase P1a, when the voltage Vcs is less than or equal to the deactivation threshold S0b. However, powering off the oscillator 16 and the counter 17 has the consequence of resetting to zero the buffer memory, as shown in FIG. 6d.

Further, as shown by FIG. 6e, the storage of the time count T in the nonvolatile memory 19 is performed at the time tREFmin, consequently the duration counted after tREFmin is lost.

Variant embodiments of the operating method have been identified, whether for the first embodiment shown in FIG. 3 or for the second embodiment shown in FIG. 4.

According to a first variant of the operating method, it is possible to provide that the microcontroller 18 is configured to write both the activation count M and the time count T in the nonvolatile memory 19 once the voltage Vcs at the terminals of the capacitive storage element Cs reaches the maximum baseline value REFmax. With such a variant, getting away from the minimum baseline value REFmin is possible. According to a specific variant, the maximum baseline value REFmax is equal to S1h, which makes it possible to do away with baseline values.

According to a second variant of the operating method, it is possible to provide that the microcontroller 18 is configured to write in alternation the activation count M and then the time count T in the nonvolatile memory 19, as soon as the voltage Vcs at the terminals of the capacitive storage element Cs reaches the maximum baseline value REFmax. The alternation is preferably regular, such as once every N, where N is for example equal to two.

In this case, the activation count M is incremented by the value N each time the maximum baseline value REFmax is reached by the voltage Vcs.

According to a third variant of the operating method, wherein the nonvolatile memory 19 comprises several data storage cells, it is possible to provide that, once the microcontroller 18 is powered, meaning once the voltage Vcs at the terminals of the capacitive storage element Cs reaches the supply threshold S1h, it writes the time count T in a first cell of the nonvolatile memory 19. When the voltage Vcs at the terminals of the capacitive storage element Cs again reaches the supply threshold S1h, the microcontroller 18 writes the new time count T in a second cell of the nonvolatile memory 19 and so on, so as to form a stacked memory.

The sum of these stacked cells or the last stack cell, according to whether the internal clock 18 or the computer 17 is reset to zero or not with each writing, corresponds to an estimate of the length of use of the sliding board 25. According to this third variant of the operating method, the activation count M is equal to the number of stacked cells. Stacked cell is understood to mean a cell wherein data was recorded. The value M1 of the activation count M is then determined at the end of writing, for example during the reading of data recorded in the nonvolatile memory 19.

In all cases, except the case of the previously described third variant of the operating method, while writing in the nonvolatile memory 19, the microcontroller 18 is configured to:
  read the time count T and the activation count M which were previously recorded in the nonvolatile memory 19, for example during previous recordings corresponding to previous uses of the sliding board;
  update the time count T and the activation count M by incrementing the previously recorded values T and M with values T and M which were just calculated; and
  recording the new time count T and the new activation count M in the nonvolatile memory 19.

In the case of the third variant of the operating method, while writing in nonvolatile memory 19, the microcontroller 18 is configured to:
  identify an empty cell adjacent to a filled cell, or the first empty cell in the case of an initial writing to memory; and
  record the value of the time count T in the cell identified during the preceding step.

Thus, whatever the variant of the operating method chosen, the nonvolatile memory 19 contains the value T, corresponding to the length of use of the sliding board since the first use thereof on snow and also the value M corresponding to the level of stresses of the sliding board since the first use thereof on snow.

It is understood that the time count T contains information related to the deformation time of the surface 12 of the sliding board and therefore information related to the length of use of the sliding board.

By making the approximation that the start-up phase P1 of the capacitive storage element is small compared to the phases during which the microcontroller 18 is active, meaning phases P2 and P3, it is possible to compare the time count T to the length of use of the sliding board 25.

Further, the counting of this time count T uses operations or components with low energy consumption, for example power under 5 μW.

The sensor 100 could solely provide this first parameter corresponding to the time count T. Instead, the invention can also give access to other values besides T depending on the electronic components chosen to form the electronic processing circuit 15.

Also, in particular, the invention proposes to provide a second parameter which is the activation count M. This activation count M aims to represent information related to the amplitude of the deformations of the surface 12. In other words, this information represents the intensity of the activity of the sliding board, or the way in which the sliding board is actually stressed.

More precisely, the operations for reading the previous number and writing the new number in memory by the microcontroller consume significant electrical power.

The activation count M therefore represents the number of times the microcontroller 18 consumed this quantity of energy; it is therefore related to the quantity of energy consumed by the microcontroller 18 in its active mode thereof. By making the approximation that executing the time count T and the start up and shut down phases of the microcontroller 18 have negligible energy consumption compared to the quantity of energy consumed during incrementing of this activation count M, it is possible to relate the activation count M to the quantity of energy stored in the capacitive storage Cs, and of the quantity of energy generated by deformation of the surface 12. Thus, the higher the count M, the more severely the sliding board 25 was stressed.

By taking the ratio of the activation count M to the length of use T, it is possible to estimate the power applied by the user.

This power can be either calculated with appropriate electronic elements added to the electronic processing circuit 15, not shown, and then stored in the nonvolatile memory 19, or be calculated after transmission of the time count T and activation count M values to an external reader, not shown.

Measurements done on downhill skis have given very different activation count M values depending on the level of the skier. Indeed, for example, an adult user with a good skiing level writes to memory 100 times (meaning an incrementation of the count M of 100) in 10 seconds, whereas a young beginner child, progressing using the snowplow technique, writes to memory only twice (meaning an incrementation of the count M of 2) in 10 seconds. The activation count M is therefore a good indicator of the ski activity, and therefore the level of the skier. The larger the value of M after a fixed length of use, the greater the activities of the skier and therefore the higher their skiing level, since the sliding board was highly stressed.

Finally, making the approximation that the electric power of the electronic processing circuit 15 is consumed mainly by the microcontroller 18 during writing of counts T, M into memory, it is possible to estimate a state of wear of the sliding board, or a level of engagement of a skier by knowing the activation count M and the energy consumed by the microcontroller 18 on each incrementation of the activation count M.

It is thus possible to know the real use of the ski, and thus to know whether the skier is stressing their ski a little or a lot; this can make it possible for a skier to be informed of the energy difference imposed on one ski compared to another, in the case where both skis from the pair of skis are equipped with sensor 100. For example, it is possible to know whether a skier is stressing one leg more strongly than the other.

After recording values of the time counter T and the activation count M in nonvolatile memory 19, microcontroller 18 or the counter 17 is reset to zero, because of their loss of power. However, it is conceivable, in the case of the second embodiment shown in FIG. 4, to provide for the microcontroller 18 to be configured to reset to zero the counter 17 before reaching the cutoff threshold S1b or after writing the time count T to memory.

An overflow past the maximum value that the counter 17 can contain can be avoided by resetting the microcontroller 18 or computer 17 to zero; this overflow would have the consequence of automatically resetting to zero, which will lead to an error in the calculation of the time count T.

Further, the values of the counts T and M can be extracted from the electronic processing circuit 15 to get information related to the deformation time of the sliding board and therefore to the length of use of the sliding board from the count T and/or information related to the amplitude of the deformations of the sliding board coming from count M. It is also possible to calculate the mechanical power generated by the user and in particular by the skier. In fact, as was previously described, the calculation of the magnitude M/T reflects the mechanical power generated by the user which can be correlated to the level of the skier. Further, the values M and M/T can give information on the actual wear of the sliding board and also the actual activity of the user in connection with their performance and their level.

In order to provide for communication and extraction of values stored in nonvolatile memory 19, the electronic processing circuit 15 comprises a portion 104 relating to communication.

This portion 104 could comprise a wired connector providing data transmission, but, preferably, the electronic processing circuit 15 comprises a radio frequency antenna 20 configured for powering the nonvolatile memory 19 by electromagnetic coupling.

In that way, an external reader can get the counts T and M wirelessly. This "RFID" transmission system comprises a passive tag which uses the wave coming from the scanner/reader for powering the nonvolatile memory 19 and thus sending the counts T and M to the scanner/reader.

Preferably, the external reader can also order the microcontroller 18 to reset to zero the count values T and M in the nonvolatile memory 19.

A ski rental center or skier performance evaluation center could have the external reader in order to centralize the information gathered on each ski, or the reader could be directly accessible to the user by using a smart-phone type device, for example.

Thus, the external reader can extract the counts T and M to get information related to the length of use of the sliding board and/or the amplitude of the deformations of said surface 12 and/or for calculating the mechanical power generated by the user and in particular by the skier.

The integration of such a sensor 100 in a sliding board 25 is described in the remainder of the description. In the description which follows, the terms relating to "front", "rear", "upper", "lower" are defined relative to the sliding board 25.

More precisely these terms are defined relative to a longitudinal axis, transverse axis and vertical axis of the sliding board 25 where the longitudinal axis is the axis along which a maximum length of the sliding board 25 is measured, the vertical axis is orthogonal to the plane of the sliding board 25 and the transverse axis is orthogonal to both the longitudinal and the vertical axes. The terms "front" and "rear" are defined along the longitudinal axis of the sliding board 25, relative to the position of the skier or the binding. The terms "upper" and "lower" are defined along the vertical axis of the sliding board 25, with the lower part being intended to be in contact with the snow, ground or water.

The invention is shown in particular in FIGS. 7 to 15 on a board for skiing which is a downhill ski or touring ski.

FIG. 7 shows a sliding board 25 having a front part 27, a rear part 28 and a central area 26 intended for mounting of the binding, arranged between these two parts 27, 28. The front part 27 refers to the part of the sliding board 25 which is normally positioned in front of the skier and which forms the tip whereas the rear part 28 refers to the part of the sliding board 25 which is normally positioned behind the skier and which forms the heel of the sliding board 25.

The binding elements, not shown, are mounted on an interface element which is made up, in the embodiment shown, of mounting and guiding rails 30 and 31, where the binding elements can slide on these rails for adjustment to the length of the skier's boot. These mounting rails are secured to the upper surface of the sliding board 25. This binding is oriented such that the skier is oriented towards the front part 27 in the direction of descent.

In a variant not shown, the interface element can be made up of at least one plate on which the binding elements are attached, where this allows the binding elements to be raised from the upper surface of the sliding board 25.

The sliding board 25 has a profile shape suited for skiing on snow. As a variant, all types of sliding boards 25 can be used without changing the invention.

The binding, not shown, comprises a front stop intended to be positioned in the front rail 30, for attaching the front part of the skier's boot, and a rear heel-piece intended to be positioned in the rear rail 31 for attaching the rear of the skier's boot.

This front stop and this rear heel-piece form the elements for binding the boot onto the sliding board.

As a variant, the shape, the type of binding, the type of rails or interface for mounting the binding on the sliding board can also vary without changing the invention.

In the case of the sliding board 25 from FIG. 7, the areas Z1 and Z2 show the two areas wherein the sliding board 25 experiences a maximum deformation during flexion of the sliding board 25 during use thereof on snow.

These areas Z1 and Z2 are also the areas wherein the sliding board 25 experiences high risks of impact. For example, the two skis of a skier can cross in these areas Z1 and Z2.

To recover the mechanical energy linked to the deformation of the sliding board 25, the invention proposes to use at least one piezoelectric element 11a-11b. In the embodiment shown, these piezoelectric elements 11a-11b are preferably arranged between the front rail 30 supporting the stop of the binding and the area Z1 experiencing a maximum deformation.

In other words, these piezoelectric elements 11a-11b are positioned very close to the area Z1, in an area where the deformations remain sufficient, and where they remain sufficiently protected, in particular from external impacts.

It is nonetheless possible to position the piezoelectric elements 11a-11b in the areas of maximum deformation Z1 and Z2 without changing the invention. In this case, protective elements could be added, in particular on the lateral sides of the piezoelectric elements 11a-11b.

The energy generated by these piezoelectric elements 11a-11b is transmitted to an electronic processing circuit 15.

Preferably, as shown in FIG. 9, this electronic processing circuit 15 is arranged very close to the piezoelectric elements 11a-11b, to make connecting the electric wires between the piezoelectric elements 11a-11b and the electronic processing circuit 15 easier.

In particular, the electronic processing circuit 15 is mounted in a case positioned above the two piezoelectric elements, at the end of the front mounting rail 30 of the stop for the binding.

In other embodiments, not shown, the electronic case containing the electronic circuit could be mounted in any other position of the sliding board 25, preferably near the mounting area for the bindings 26, at the front or rear of this area, even between the front and rear binding elements for the boot, even inside a plate interposed between the sliding board 25 and the ski binding.

FIGS. 10 to 13 show the mounting of the piezoelectric elements 11a-11b and of the electronic circuit 15 on the sliding board 25. As shown in FIG. 10, the piezoelectric elements 11a-11b are secured to the sliding board 25 and more specifically onto a surface of an element of the sliding board, where the surface can be internal or external to the sliding board. They can be applied by adhering onto one of the layers of the structure of the sliding board 25 after molding the sliding board 25, or be immersed and therefore integrated inside the structure of the sliding board 25 during molding of the sliding board 25.

FIGS. 10 to 13 show the layout of two juxtaposed piezoelectric elements 11a-11b.

As a variant, a single piezoelectric element can be placed. The number of piezoelectric elements 11a-11b is chosen such that the energy recovery is sufficient to power the associated electronic processing circuit 15.

According to the example shown, each piezoelectric element 11a-11b comprises an upper circular central part forming the active part of the piezoelectric material, configured for sensing deformations of a surface 12 of the sliding board 25, and a lower circular part arranged below the circular central part and with larger dimensions than it, forming a reference ground.

Of course, other piezoelectric element shapes can be used, like for example quadrilateral shaped piezoelectric elements. Electric energy produced during a deformation of the surface 12 of the sliding board 25 is captured between the upper circular central part and the lower circular part. As a variant, other piezoelectric element 11a-11b shapes can be used without changing the invention. It should be noted that the electric energy produced by each piezoelectric element 11a, 11b is proportional to the volume of piezoelectric material that it comprises.

The internal structure of the sliding board 25 is described in the following paragraphs with reference to FIGS. 14 and 15 in order to illustrate the integration of the piezoelectric elements 11a-11b into the sliding board 25 and in particular in order to show on which surface 12 of the sliding board 25 the piezoelectric elements can be attached.

The sliding board 25 comprises a lower assembly 37, and an upper assembly 38, separated by a core 39.

More specifically, the lower assembly 37 comprises a sliding bottom 40 typically polyethylene based, on which fins of metal edges 41 rest laterally. In the form shown, this lower assembly 37 also includes a reinforcing layer 42.

The sliding board 25 also includes an upper assembly 38 comprising a decorative and protective layer 43 resting on a reinforcing layer 44.

The decorative and protective layer 43 can be made in various ways, and includes on the lower surface thereof printed areas visible from the upper surface of the board, or else transparent areas, serving to make the reinforcing layer 44 visible from the outside.

The upper 38 and lower 37 assemblies are mainly separated by the core 39, which is bordered laterally by the sidewalls 45 which protect the core 39 from outside moisture, and which provide the transmission of forces from the upper assembly to the edges 41. In other variants of sliding board structures 25, not shown, the structure might not comprise sidewalls, and be of "shell" type for example, one might even comprise several reinforcing layers, or even might not comprise edges.

In the first embodiment of FIG. 14, the piezoelectric elements 11a-11b are attached directly onto the decorative and protective layer 43. Preferably, the piezoelectric elements 11a-11b are attached by adhering onto the decorative and protective layer 43 or onto the support layer. To do this, it is preferable to use a rigid adhesive with a large shearing resistance, for example epoxy, in order to not modify and attenuate the real values of the deformations of the sliding board 25. However, a very thin double-sided type adhesive element creating little shear inside this layer could be considered.

In a variant of this embodiment, a rigid support layer can be attached onto the decorative and protective layer 43 to support the piezoelectric elements 11a-11b. For example, an aluminum support layer can be used.

In the second embodiment of FIG. 15, the piezoelectric elements 11a-11b are attached onto the reinforcing layer 44. To do this, the decorative and protective layer 43 is recessed at the surface 12 for attachment of the piezoelectric elements 11a-11b, the piezoelectric elements then being arranged in this recess.

As in the first embodiment of FIG. 12, attachment of the piezoelectric elements 11a-11b by adhesion can be carried out, either during molding of the sliding board, or after molding of the sliding board.

The invention also requires the positioning of the electronic circuit 15 on the sliding board 25. Also, a support 32 is added to the sliding board 25 to support the electronic processing circuit 15, as shown in FIG. 11.

Preferably, this support 32 is removable so as to be able to perform maintenance on the electronic processing circuit 15 by separating the electronic processing circuit 15 from the sliding board 25. This support 32 can be connected by clipping or screwing onto the sliding board 25 or the mounting rail 30 for the binding stop. For example, the support 32 can comprise tabs intended to engage with the holes made in the front part of the mounting rail 30.

This support 32 also defines the position of the electronic processing circuit 15 on the sliding board 25.

In the example from FIGS. 7 to 13, the electronic processing circuit 15 is arranged at the front of the front mounting rail 30 for the binding stop and above the piezoelectric elements 11a-11b. As a variant, the electronic circuit 15 can be arranged on the piezoelectric elements 11a-11b without connection to the mounting rail 30 or the front stop of the binding, by being attached to the sliding board.

Moreover, as shown in FIG. 11, the electronic processing circuit 15 can be screwed onto the support 32, or clipped or even adhered. The electronic processing circuit 15 is next electrically connected to the piezoelectric elements 11a-11b by means of wires or a suitable connector.

As shown in FIG. 12, a protective cover 33 is mounted on the support 32 so as to protect the electronic processing circuit 15 and the piezoelectric elements 11a-11b. The protective cover 33 can also be attached by screwing or adhering, for example with the support 32.

Also, the assembly formed by the support 32 and the protective cover 33 forms a case receiving the electronic processing circuit 15 and this case is preferably sealed to protect the electronic components from snow or water; this case is easy to remove from the sliding board.

This protective cover 33 preferably has an aerodynamic shape for limiting the drag of the wind on the sliding board 25 and limiting the risk of impact to the electronic processing circuit 15 or the piezoelectric elements 11a-11b.

In the example shown, the sensor 100 is composed of a case containing the electronic processing elements added to the sliding board and of piezoelectric elements independent of the case bound to the sliding board and connected to the electronics.

In another embodiment not shown, the sensor 100 could be composed of a single case which would contain the electronic processing elements and which would have, under the lower surface thereof, a layer including the piezoelectric elements connected to the electronics. This assembly would then be secured to one of the surfaces of the sliding board.

In the case of a sliding board 25 which is a cross-country ski, the location of the piezoelectric elements and the electronic processing case can be similar to that proposed for downhill skis, or it can be advantageous to position the piezoelectric elements farther forward from the front stop of the binding by several centimeters, or even several tens of centimeters to get larger amplitude of deformations. This sensor 100 will be entirely usable in the case of a cross-country ski because of the very low weight thereof, of the order of 10 to 50 g, provided by the components of the sensor 100.

In the case of a sliding board 25 which is a snowboard supporting both feet of the user, the sliding board 25 would be provided with two distinct bindings. The piezoelectric elements and also the electronic processing case could be positioned on the lateral side of either of the bindings, on the side of the ends of the board, or could be positioned between the two bindings, in a relatively protected area.

This invention combining piezoelectric elements 11a-11b and electronic processing circuit 15 has the advantage of storing data T, representing the real-time use of the sliding board 25, and M, representing the intensity of the use of the sliding board 25, this data originating from the sliding board 25 during stressing of the sliding board 25.

The start-up of the analysis is automatic as soon as the sliding board 25 is moving and the user does not need to be concerned about either starting up the system, the power source thereof, or electric recharging of the system, since the electronic processing circuit 15 is autonomous because it is directly powered by the piezoelectric sensors 11a-11b. The user can next access the data T, M recorded in the memory 19 installed on the sliding board 25, and do so later, when the sliding board 25 is no longer in use.

Thus, the invention makes use of at least one piezoelectric element 11a-11b:
which is both a generator of electric energy for the electronic processing circuit 15
and which is also a sensor for measurement of the deformations of the sliding board in the sense that the voltage Vpa, Vpb delivered by the at least one piezoelectric element 11a-11b is used by the electronic processing circuit 15 which is configured for estimating representative values of the use of the sliding board, such as a usage time and/or a level of amplitude of the deformations of the sliding board based on the delivered voltage Vpa, Vpb.

The invention thus makes it possible to analyze the performance of a user of a sliding board by obtaining information linked to the use of a sliding board while dispensing with an additional power source, and in particular an electrochemical battery.

The invention makes it possible to analyze the performance of a user compared to baseline performance values with a view to establishing their skiing level, and advising them of exercises suited to their level, ski lessons suited to their level, skis suited to their level.

The invention claimed is:

1. A system for analysis of the performance in use of a sliding board comprising:
   a database storing baseline performance;
   a sensor sensitive to the deformations of said sliding board; and
   a monitoring body configured to:
   determine the performance in use of said sliding board based on measurements from said sensor; and
   compare said performance in use with said baseline performance; characterized in that said sensor is secured to said sliding board and comprises:
   at least one piezoelectric element secured to said sliding board and configured to generate electric energy during the deformations of said sliding board; and
   an electronic processing circuit, powered exclusively by said electric energy generated by said at least one piezoelectric element, configured to estimate a duration of the phases of deformations of said sliding board and to estimate an image of the mechanical energy dissipated during the deformations of said sliding board;
   said performance in use including a stressing time, corresponding to said duration of the phases of deformation of said sliding board, and an image of the mean stressing power corresponding to the relationship between the image and said duration of the deformation phases;

said baseline performance being determined by a sensor, analogous to said sensor secured to said sliding board, so as to obtain a baseline stressing time and a baseline stressing mean.

2. The analysis system according to claim 1, wherein said performance in use includes a speed measured by a position sensor; this measured speed being compared to a baseline speed.

3. The analysis system according to claim 2, wherein said monitoring body is configured to authorize access to a high-level route when said speed and said number of turns made are greater than said baseline speed and than said baseline number of turns made.

4. The analysis system according to claim 2, wherein said monitoring body is configured to classify a user of a sliding board in relation to classifications of predefined levels based on said comparison carried out by said monitoring body.

5. The analysis system according to claim 1, wherein said performance in use includes a number of turns made detected by a gyroscope; this number of turns made being compared to a baseline number of turns made.

6. The analysis system according to claim 1, wherein said monitoring body is configured to determine corrected performance in use based on said performance in use and on a variable related to a flexural rigidity of said sliding board; the comparing is implemented from said corrected performance in use.

7. The analysis system according to claim 6, wherein said variable related to a flexural rigidity of said sliding board is obtained from the model of said sliding board and from a database storing different models of sliding boards and corresponding flexural rigidity coefficients.

8. The analysis system according to claim 1, wherein said monitoring body is configured to determine corrected performance in use based on said performance in use and on a variable related to the type of snow over which said sliding board is progressing; the comparing is implemented from said corrected performance in use.

9. The analysis system according to claim 8, wherein said variable related to the type of snow over which said sliding board is progressing is obtained from a temperature sensor.

10. The analysis system according to claim 8, wherein said variable related to the type of snow over which said sliding board is progressing is obtained from a position sensor and from a database storing weather information related to different positions.

11. The analysis system according to claim 1, wherein said monitoring body is configured to authorize access to a high-level route when said stressing time is less than a baseline stressing time and when said mean stressing power is greater than a baseline mean stressing power.

12. The analysis system according to claim 1, wherein said monitoring body is integrated into a mobile application of a smartphone.

\* \* \* \* \*